United States Patent [19]

Itoh et al.

[11] Patent Number: 4,717,479

[45] Date of Patent: Jan. 5, 1988

[54] HYDROPHILIZED POROUS POLYOLEFIN MEMBRANE AND PRODUCTION PROCESS THEREOF

[75] Inventors: Hajime Itoh, Hiroshima; Kazutami Mitani, Ohtake, both of Japan

[73] Assignee: Mitsubishi Rayon Co., Ltd., Tokyo, Japan

[21] Appl. No.: 30,745

[22] Filed: Mar. 27, 1987

Related U.S. Application Data

[62] Division of Ser. No. 928,163, Nov. 7, 1986, Pat. No. 4,678,813.

[30] Foreign Application Priority Data

Nov. 11, 1985 [JP]  Japan ............................. 60-252203
Nov. 12, 1985 [JP]  Japan ............................. 60-253561

[51] Int. Cl.$^4$ ............................................ B01D 25/04
[52] U.S. Cl. .............................. 210/490; 210/500.23; 210/506; 210/500.36; 210/500.42; 521/61; 521/62; 521/134; 521/143

[58] Field of Search ................ 521/61, 62, 134, 143; 210/490, 500.23, 506, 500.36, 500.42

[56] References Cited

U.S. PATENT DOCUMENTS

| | | | |
|---|---|---|---|
| 2,990,378 | 6/1961 | Hurwitz et al. | 521/53 |
| 3,413,245 | 11/1968 | Sambeth | 521/53 |
| 4,394,457 | 7/1983 | Ogassa | 521/54 |

*Primary Examiner*—Morton Foelak
*Attorney, Agent, or Firm*—Oblon, Fisher, Spivak, McClelland & Maier

[57] ABSTRACT

The present invention discloses a hydrophilized porous polyolefin membrane with a polymer of a monomer, which has an HLB value of 2–20, held on at least a part of the pore walls of a porous polyolefin membrane as well as its production process. This hydrophilized porous polyolefin membrane has long-lasting hydrophilicity and good mechanical strength.

4 Claims, No Drawings

HYDROPHILIZED POROUS POLYOLEFIN MEMBRANE AND PRODUCTION PROCESS THEREOF

This is a division of application Ser. No. 928,163 filed Nov. 7, 1986, U.S. Pat. No. 4,678,813, July 7, 1987.

BACKGROUND OF THE INVENTION (1) Field of the Invention

This invention relates to a porous membrane permitting permeation of a hydrophilic liquid therethrough and a production process thereof.

(2) Description of the Prior Art

The fields of application of porous polyolefin membranes is growing rapidly due to their excellent mechanical properties and chemical resistance. Porous polyolefin membranes are however hydrophobic, and when used as is water permeates therethrough with difficulty. A hydrophilizing treatment is therefore indispensable to have hydrophilic liquids including water to permeate therethrough. A variety of methods have been studied with a view toward imparting hydrophilicity through surface modification of polyolefin membranes. Hydrophilizing methods, which have been proposed for film-like materials featuring smooth surfaces, cannot be simply applied to impart hydrophilicity to porous membranes having complex surface configurations.

As hydrophilizing methods for porous polyolefin membranes, there have been known the organic solvent wetting and water substituting method, the physical adsorption method, the chemical surface modification method and other methods. In the organic solvent wetting and water substituting method, the entire surface of a porous polyolefin membrane, inclusive of minute pores, is subjected to a wetting treatment with an organic solvent having good miscibility with water such as an alcohol or ketone, followed by the substitution of water for the organic solvent. If water is once lost from minute pores during storage or use, the part containing these water-free minute pores regains hydrophobicity and no longer permits the permeation of water therethrough. Accordingly, it is always necessary to keep water around the porous membrane in the above method. The porous membrane is therefore cumbersome to handle. According to the physical adsorption method, a hydrophilic material such as polyethylene glycol or a surfactant is adsorbed on the pore walls of a porous membrane so as to impart hydrophilicity to the porous membrane (see, for example, Japanese Patent Laid-Open Nos. 153872/1979 and 24732/1984). Although this method is easy to practice, the hydrophilic material drops off if the resulting porous membrane is used over a long period of time. Therefore, this method cannot be regarded as a satisfactory hydrophilizing method.

As a chemical surface modification method, it has been proposed, for example, to expose a porous membrane to radiation while holding a hydrophilic monomer on the surface of the membrane (Japanese Patent Laid-Open No. 38333/1981) or to subject the porous structure of a hydrophobic resin to a plasma treatment in a state impregnated with a water-soluble high-molecular material and a surfactant (Japanese Patent Laid-Open No. 157437/1981). These methods are however accompanied by one or more problems. It is difficult to impart uniform hydrophilicity in the direction of the thickness of a membrane, no matter which of these methods is relied upon. If one attempts to apply a hydrophilizing treatment uniformly over the entire thickness of a porous membrane when the membrane has a large thickness or is in the form of hollow fiber, the mechanical strength of the matrix of the porous membrane is unavoidably reduced.

As has been described above, no effective hydrophilizing method has been established to date for porous polyolefin membranes.

SUMMARY OF THE INVENTION

An object of this invention is to provide a porous polyolefin membrane imparted with hydrophilicity of excellent durability over almost all of the pore walls of the membrane and having sufficient mechanical strength.

In one aspect of this invention, there is thus provided a hydrophilized porous polyolefine membrane, wherein a polymer of a monomer having an HLB value of 2-20 is held on at least a part of the pore walls of a starting porous membrane of a polyolefin.

In another aspect of this invention, there is also provided a process for the production of the aforementioned hydrophilized porous polyolefin membrane, which comprises the steps of holding a monomer which has an HLB value of 2-20 and contains at least one unsaturated polymerizable bond and a polymerization catalyst on at least a part of the pore walls of a starting porous polyolefin membrane and heating them to polymerize the monomer

DESCRIPTION OF THE PREFERRED EMBODIMENTS

In the present invention, the polyolefin forming the porous membrane includes a polymer or copolymer composed principally (80 wt. % or more) of one or more monomers selected from the group consisting of ethylene, propylene, 4-methyl-1-pentene and 3-methyl-1-butene and a fluorinated polyolefin.

The starting porous membrane may be in any form such as a hollow fiber membrane, planar membrane or tubular membrane. Although starting porous membranes having various pore sizes may be employed depend on the end use, the preferred starting porous membranes may include those having a membrane thickness of about 20–200 $\mu$m, a porosity of about 20–90 vol. %, a water permeability of about 0.001–10 l/min.hr.mmHg as measured by the alcohol-dependent hydrophilizing method, and a pore size of about 0.01–5 $\mu$m.

The monomer (hereinafter called "surface active monomer") useful in the practice of this invention, the HLB value of which ranges from 2 to 20, contains at least one unsaturated polymerizable bond, at least one hydrophilic moiety and at least one hydrophobic moiety in its molecule. It is immaterial whether the monomer is ionic or nonionic. Although no particular limitation is imposed on its molecular weight, it is preferably 10,000 or less, more preferably 5,000 or less, and most preferably 3,000 or less. As the unsaturated polymerizable bond which the monomer contains, may be-mentioned a double bond such as vinyl bond or allyl bond or a triple bond such as diacetylene bond. Illustrative examples of the hydrophilic moiety include ethylene oxide, phosphoric esters, sulfonic group and its salts, hydroxyl group, carboxylic acid groups and their salts and quaternary ammonium group. On the other hand, exemplary hydrophobic moieties include hydrocarbon chains such as methylene group, alkyl groups, phenyl group, vinyl group, allyl group and acetylene bond and C$_3$— and higher alkylene oxides such as propylene oxide and butene oxide.

As specific examples of the monomer, compounds represented by any one of the following general formulae (1)–(13) may be mentioned by way of example.

$$H_2C=CR^1COO(EO)_l(R^2)_m(EO)_nCOCR^1=CH_2 \quad (1)$$

$$H_2C=CR^1COO(R^2)_l(EO)_m(R^2)_nCOCR^1=CH_2 \quad (2)$$

$$H_2C=CR^1COO(EO)_l(R^2)_m(EO)_nR^3 \quad (3)$$

$$H_2C=CR^1COO(R^2)_l(EO)_m(R^2)_nR^3 \quad (4)$$

$$H_2C=CR^1COO(EO)_l(R^2)_mCOCR^1=CH_2 \quad (5)$$

$$H_2C=CR^1COO((CH_2)_4O)_kCOCR^1=CH_2 \quad (6)$$

(7)

$$H_2C=CR^1COO(EO)_iPO(OH)OR^4 \quad (8)$$
$$H_2C=CR^1CH_2(OCH_2CH(OH)CH_2)_hSO_3M \quad (9)$$

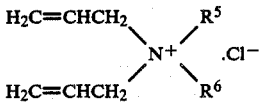
(10)

$$H_2C=CR^1COO(EO)_jCOCR^1=CH_2 \quad (11)$$

$$CH_3(CH_2)_iC\equiv CC\equiv CCOOH \quad (12)$$

$$CH_3(CH_2)_iC\equiv CC\equiv C(CH_2)_jCOOM \quad (13)$$

In the general formulae (1)–(13), l, m, n, k, h, i, j, EO, R$^1$, R$^2$, R$^3$, R$^4$, R$^5$, R$^6$ and M are defined as given below. Depending on the manner of selection of the chain length of ethylene oxide or propylene oxide and the chain length of each alkyl group, some compounds outside the scope of the present invention may also be included. These chain lengths are however suitably chosen in the present invention, and compounds, the HLB values of which fall within the range of 2–20, are employed in the present invention.

l, m, n, k, h: integer of 1–100
i, j: integer of 1–20
EO: —CH$_2$CH$_2$O—
R$^1$: H or CH$_3$—

R$^2$: 
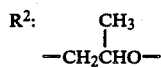

R$^3$, R$^4$, R$^5$, R$^6$: alkyl group having 4–20 carbon atoms
M: alkali metal Although the HLB value of the surface active monomer useful in the practice of this invention ranges from 2 to 20, a range of 5–15 is particularly preferred. It should be noted that, as HLB values referred to in the present invention, those determined by the method proposed by Davies [Progress The Second International Congress of Surface Activity, 1, 426, (1957)] were adopted.

In the hydrophilized porous membrane of this invention, a hydrophilic polymer composed of a monomer having an HLB value of 2–20 is held on at least a part of the pore walls of a starting porous polyolefin membrane. It is sufficient if the hydrophilic polymer is held on the pore walls to such an extent that when the porous membrane is used by allowing water to permeate through its pores under the usual intermembrane pressure difference, an acceptable flow rate is achieved through the membrane. It is not absolutely necessary to cover the entire pore walls with the hydrophilic polymer. Furthermore, the hydrophilic polymer may also be held on the outer surfaces of the porous membrane. The term "held" as used herein means that the hydrophilic polymer is bonded or otherwise adhered firmly to the pore walls to such a degree that the hydrophilic polymer easily drops off in the course of storage or use of the porous membrane. The hydrophilic polymer may be graft-polymerized to the pore walls or may firmly adhere to the fine porous area and stick there owing to its anchorage in the individual pores. As a further alternative, the hydrophilic polymer may also be held by both graft-polymerization and anchorage.

In the present invention, the hydrophilic polymer composed of the monomer, the HLB value of which ranges from 2 to 20, is characterized in that it is practically insoluble in water and its degree of hydrophilicity is great compared to polyolefins. A porous membrane with the hydrophilic polymer held on at least a part of pore the walls of a starting porous polyolefin membrane has substantially permanent hydrophilicity.

On the other hand, monomers, the HLB values of which are greater than 20, have little interaction with polyolefins. It is hence difficult to hold their polymers on the pore walls of starting porous membranes and moreover, the polymers of these monomers have large solubility in water. If porous membranes which have been obtained by holding these polymers on the pore walls of starting porous polyolefin membranes are used in water, the polymers dissolve in water and hence are lost. There is thus the danger that the properties of the pore walls of the porous membranes, on which pore walls the polymers are held at the beginning, will change from hydrophilic properties to hydrophobic properties. Further, polymers formed of monomers having HLB values smaller than 2 are insoluble in water. The degrees of their hydrophobicity is however so great that the pore walls of porous polyolefin membranes, on which pore walls the polymers are held, do not show any hydrophilicity.

It may be considered to convert the polymers of monomers, the HLB values of which exceed 20, into polymers with crosslinked structures introduced therein with a view toward lowering the water-solubility of the former polymers. This however leads to the drawbacks that the thus-crosslinked polymers will swell in water and that the pore sizes of porous membranes will become smaller.

The amount of the hydrophilic polymer held on at least a part of the pore walls of a porous polyolefin membrane according to this invention may be 0.5–100 wt. % preferably 0.5–50 wt. %, more preferably 1–30 wt. %, and most preferably 2–15 wt. %.

A variety of processes may be employed to obtain the porous membranes of this invention. However, they are usually obtained by polymerizing a surface-active monomer while holding the surface-active monomer in a state adhered to the pore walls of a porous polyolefin membrane.

As a method for causing the surface-active monomer to adhere to the porous membrane, the following method may be employed by way of example. A solution of a surface-active monomer and if necessary, a polymerization catalyst dissolved in a suitable solvent such as an organic solvent or water, is prepared. After impregnating a starting porous polyolefin membrane with the above solution by immersing the porous polyolefin membrane in the solution or by fabricating a membrane module with the porous polyolefin membrane and then causing the solution to penetrate under pressure into the porous polyolefin membrane, the solvent is cause to evaporate off. It is also possible to cause the surface-active monomer to adhere almost uniformly over the entire surface of the porous membrane without plugging the pores of the porous membrane by using the surface-active monomer in a form diluted with a solvent. The amount of the surface-active monomer to be adhered can be adjusted by changing the concentration of the surface-active monomer in the solution.

The surface-active monomer held on the pore walls of the porous polyolefin membrane in the above-described manner can then be polymerized by, for example, heat polymerization, photopolymerization or radiation polymerization, whereby a hydrophilic polymer can be formed on the pore walls of the porous membrane.

The solvent useful upon preparation of the above-described solution includes water or an organic solvent which has a boiling point lower than the surface-active monomer and can dissolve the surface-active monomer therein. When a polymerization catalyst is added, it is desirable to use a solvent which can also dissolve the polymerization catalyst. When water is employed as the solvent, it is possible to disperse even a polymerization catalyst which is inherently insoluble in water as minute particles in water owing to the surface activity of the surface-active monomer. The polymerization catalyst can thus act practically as if dissolved. It is therefore possible to use water as the solvent even when a water-insoluble polymerization catalyst is added.

Since the surface of a porous polyolefin membrane is hydrophobic, a surface-active monomer tends to be adsorbed on the pore walls with its hydrophilic groups oriented outward when an aqueous solution containing the surface-active monomer penetrates into the pores. If the surface-active monomer is fixed in this state by polymerization, hydrophilicity can be imparted with extremely high efficiency. Use of water as a solvent is preferable from the viewpoint of workability, maintenance of good working environment and other conditions.

By contrast, use of an organic solvent as the solvent has the merit that the resulting solution is allowed to penetrate into pores of a porous polyolefin membrane in a short period of time and that the solvent can be removed with ease from the pores.

Even when the surface-active monomer is polymerized in a state oriented at random on the pore walls instead of making use of the above-mentioned oriented adsorption, the resulting hydrophilic polymer has a great degree of hydrophilicity compared to polyolefins. Compared with pore walls not holding the hydrophilic polymer thereon, pore walls with the hydrophilic polymer held thereon have higher hydrophilicity.

As the polymerization catalyst employed upon polymerization of the surface-active monomer, it is possible to use any of the various peroxides such as azo compounds and redox initiators which are known as radical polymerization initiators for heat polymerization. Exemplary polymerization catalysts include benzoyl peroxide, dicumyl peroxide, azobisisobutyronitrile, azomethane and combinations of metal salts and hydrogen peroxide.

In the case of photopolymerization, it is possible to use photopolymerization catalysts, for example, carbonyl compounds such as diacetyl, benzil, benzaldehyde and cyclohexanone; ketone compounds such as benzophenone, parachlorobenzophenone, 2,4-dichlorobenzophenone, cyanobenzophenone, benzophenone sulfide and acetophenone; anthraquinone compounds such as anthraquinone and 2-ethylanthraquinone; azo compounds such as azobisisobutyronitrile and azomethane; benzoyl peroxide; uranyl biacetylnitrate; benzyl dimethyl ketal; dibenzothiazolyl sulfide; eosin; erythrosine; neutral red; and victoria blue.

Organic solvents capable of dissolving both the surface-active monomer and the polymerization catalyst include methanol, ethanol, butanol, propanol, chloroform, acetic acid, toluene, benzene, acetone, methyl ethyl ketone, methyl isobutyl ketone, tetrahydrofuran, dimethyl formamide, dimethyl acetamide and dimethyl sulfoxide. Although no particular limitation is imposed on the boiling point of these organic solvents, the boiling point is preferably about 100° C. or lower and more preferably about 80° C. or lower because this lower boiling point facilitates evaporation of the solvent upon its removal prior to the polymerization step. Regarding the proportions of the surface-active monomer, solvent and polymerization catalyst in a solution, it is possible to employ conditions such that the solvent and polymerization catalyst are contained in amounts of 50–10,000 parts by weight and 0.001–100 parts by weight, respectively, per 100 parts by weight of the surface-active monomer. As more preferable conditions, the solvent and polymerization catalyst will be in amounts of 500–10,000 parts by weight and 0.01–30 parts by weight respectively, both, per 100 parts by weight of the surface-active monomer.

When a starting porous polyolefin membrane is subjected to an immersion or penetration treatment by using the above-described solution, the immersion or penetration time may be about 0.5 second–30 minutes. This treatment can be effected in a shorter period of time as the wetting characteristics of the solution for the porous polyolefin membrane become better. After the dipping treatment, the accompanying extra solution is removed and if necessary the solvent penetrated in the pores is caused to evaporate, followed by a polymerization step. If the temperature is too high upon evaporation of the solvent, the polymerization catalyst may be decomposed and the polymerization may hence be caused to proceed partially while the solvent still remains. As a result, the polymerization may take place not on the pore walls of the porous membrane but within its pores and some pores may hence be plugged. It is therefore not desirable to use too high temperature. For this reason, about 10°–40° C. is preferred as the temperature upon removal of the solvent.

In heat polymerization, the polymerization temperature is above the decomposition temperature of the above-mentioned polymerization catalyst. It is also desirable to choose a temperature in which the membrane structure of the porous polyolefin membrane is not changed and the matrix of the membrane is not damaged. It is generally preferable to use a temperature of about 30°–100° C. Although the heating time depends on the type of polymerization catalyst and the heating temperature, it is generally about 1 minute–5 hours and more preferably about 5 minutes–60 minutes in a batch process. Since the heat transfer efficiency is higher in a continuous process, the polymerization can be achieved in a shorter period of time. Therefore, the heating time may usually be about 10 seconds–60 minutes with about 20 seconds–10 minutes being preferred.

In photopolymerization, ultraviolet rays or visible light can be used as the light to be irradiated. Ultraviolet rays having large energy are particularly preferred. As the ultraviolet ray source, a low-pressure mercury lamp, high-pressure mercury lamp, xenon lamp, arc lamp or the like may be used.

Light irradiation conditions are dependent on the intensity of light to be irradiated. It is difficult to impart sufficient hydrophilicity at a low irradiation intensity. On the other hand, porous polyolefin membranes are significantly damaged at high irradiation intensity. It is hence essential to choose suitable light irradiation conditions. When a mercury vapor lamp is used as an exemplary light source, it is necessary to set the input at about 10–300 W/cm and to irradiate light for about 0.5–300 seconds at a distance of about 10–50 cm so that a porous polyolefin membrane is exposed to light with energy of about 0.001–10 joule/cm$^2$ or more preferably about 0.05–1 joule/cm$^2$.

Radiation polymerization can be conducted, for example, by irradiating electron beams to about 10–50 Mrad at a temperature below 120° C., more preferably below 100° C., by means of an electron beam irradiation apparatus.

The surface-active monomer held on the pore walls of the starting porous membrane is graft-polymerized to the porous membrane or is polymerized on the surfaces of the porous membrane by any one of these polymerization techniques. At least a part of the pore walls of the porous membrane is therefore covered by the resulting polymer.

Among the above-mentioned polymerization techniques, it is most preferable to effect the polymerization by thermal energy. Since use of the thermal energy allows even pore portions of the porous membrane uniformly to be heated to a desired temperature, the surface-active monomer can be uniformly polymerized over the entire pore walls on which the surface-active monomer is held. Heat polymerization has another advantage in that the polymerization can be achieved without modification of the membrane structure and deterioration of the membrane matrix if the polymerization temperature is suitably chosen. By contrast, the use of light energy involves the problem that the light cannot sufficiently reach the pore portions of the porous membrane due to scattering of the light. Furthermore, the use of radiation energy is accompanied by the drawback that the membrane matrix is liable to accelerated deterioration.

If oxygen exists in the atmosphere upon polymerization, the polymerization reaction is significantly impaired. It is therefore desirable to effect the polymerization in a substantially oxygen-free state, for example in an inert gas atmosphere like a nitrogen gas atmosphere or in vacuo.

It is also desirable to remove unnecessary materials such as unreacted monomer or free polymer with an appropriate solvent subsequent to the formation of the polymer. Where the hydrophilic polymer formed on the pore walls of the porous membrane is an uncrosslinked polymer, it is preferable to use a solvent that dissolves the unreacted monomer but does not dissolve the hydrophilic polymer. Where the hydrophilic polymer is a crosslinked polymer, a solvent which can dissolve the unreacted monomer is used.

The porous membrane of this invention can be obtained in the above-described manner.

The individual steps of the process of this invention have been separately described above. It should however be noted that such individual steps as holding of the surface-active monomer on the pore walls of a porous membrane, removal of the solvent, polymerization and washing after the polymerization can be performed continuously in the present invention.

The present invention will hereinafter be described specifically by the following Examples. In each Examples, a porous membrane with slit-like spacings, which were defined by fibriles and knots extended three-dimensionally, was used and the pore size of the porous membrane was defined in terms of the average width and length of the slit-like spacings. Water penetration pressure, water permeability, and water permeability by the alcohol-dependent hydrophilizing method were each measured in accordance with the following methods by fabricating test membrane modules each of which had an effective membrane area of 163 cm$^2$. In addition, the amount of polymer held and the surface coverage (%) were also measured by the following methods:

(1) Water penetration pressure:

Water of 25° C. was fed from one side (the inside of hollow fibers in the case of a hollow fiber membrane) of a test membrane module while raising the water pressure at a rate of 0.1 kg/cm$^2$ per minute. Water pressures were measured when the cumulative quantity of penetrated water had reached 30 ml and 50 ml separately. The water pressures and quantities of penetrated water were plotted along the axis of the abscissa and the axis of the ordinate respectively. The pressure at the crossing point between the straight line, which connected the thus-plotted two points, and the axis of abscissas was determined. The pressure was employed as the water penetration pressure.

(2) Water permeability:

Water of 25° C. was caused to flow from one side of a test membrane module (the inside of hollow fibers in the case of a hollow fiber membrane). While maintaining the intermembrane pressure difference at 50 mmHg, the quantity of permeated water was measured. From this data, the water permeability (l/m$^2$.hr.mmHg) was determined.

(3) Water permeability by the alcohol-dependent hydrophilizing method:

Ethanol was fed under pressure at a flow rate of 25 ml/min for 15 minutes from one side of a test membrane module (the inside of hollow fibers in the case of a hollow fiber membrane) which had not been subjected to any hydrophilizing treatment, whereby the porous membrane was wet fully to the interior of its pores with ethanol. Thereafter, water was caused to flow at a flow rate of 100 ml/min for 15 minutes so that the ethanol contained within the pores was substituted by water.

The water permeability was then measured by the method described in the above testing method (2).

(4) Amount of polymer held:

Each polymer held on porous polyolefin membrane was measured in terms of wt. % based on the unit weight of the membrane.

(5) Surface coverage (%):

Each porous membrane was immersed for 1 minute in the standard solution (blue) for wetting tests described in JIS K6768(1971), and having a surface tension of 54 dyn/cm. Thereafter, the membrane was dried in air, and a transverse cross-section of the porous membrane was observed at 10 points through an optical microscope so as to determine the percentage (%) of the colored part relative to the membrane thickness. The value was employed as the surface coverage (%).

(6) Flex fatigue test:

While applying a load of 50 g/fil to a hollow fiber, the number of bending strokes (bending angle: 90°) required until the hollow fiber ruptured was counted.

EXAMPLE 1

A membrane module having an effective membrane area of 163 cm² was fabricated by using porous polyethylene hollow fibers, which had slit-like pores having an average width of 0.5 μm and an average length of 2 μm, a porosity of 68%, a membrane thickness of 70 μm, an inner diameter of 270 μm, and a water permeability of 1.3 l/m².hr.mmHg as measured by the alcohol-dependent hydrophilizing method. From the inside of the hollow fibers of the membrane module, a solution of the composition given in Table 1 was caused to flow under pressure at 7.5 ml/min for 10 minutes. Thereafter, the membrane module was put in a nitrogen gas atmosphere, in which extra solution was removed. The membrane module was then dried for 16 hours in air. The membrane module was thereafter subjected to a heat treatment at 60° C. for 30 minutes in a nitrogen gas atmosphere, followed by thorough washing with acetone to obtain a hydrophilized porous membrane of this invention.

Subsequently measured were the amount of the resulting polymer held on the porous membrane and the water penetration pressures after the impartation of hydrophilicity.

In order to evaluate the durability of the hydrophilicity imparted by the hydrophilizing treatment, water was caused to flow at 600 ml per cm² through the test membrane module after the hydrophilizing treatment. Thereafter, the test membrane module was dried and the water penetration pressure was measured. These operation were repeated five times. The water penetration pressure after the 5 cycles of the water-washing and drying was exactly the same as the water penetration pressure before the water-washing and drying. The durability of the product of the present Example was hence confirmed.

The results are summarized in Table 1.

EXAMPLES 2-6

Porous polyethylene hollow fibers, each of which had slit-like pores having an average width of 0.5 μm· and an average length of 2 μm, a porosity of 68%, a membrane thickness of 60 μm, an inner diameter of 270 μm, and a water permeability of 1.3 l/m²hr.mmHg as measured by the alcohol-dependent hydrophilizing method, were separately immersed for 3 seconds in solutions of the compositions given in Table 1. The hollow fibers were thereafter taken out of their corresponding solutions and put in a nitrogen gas atmosphere, where extra solutions were removed. After drying for 16 hours in air, each of the porous hollow fibers were heat-treated at 60° C. for 30 minutes in a nitrogen gas atmosphere so that polymers were held on the pore walls of the corresponding porous hollow fibers. The porous hollow fibers were then thoroughly washed with acetone to obtain hydrophilized porous membranes of this invention. The amounts of the polymers held on the hollow fibers and the water penetration pressures of the hollow fibers were measured.

Regarding the hydrophilized porous hollow fibers of Examples 2 and 4, their surface coverages (%) were measured and flex fatigue tests were performed thereon. Furthermore, their durability was also evaluated. The surface coverages (%) of the porous hollow fibers of Examples 2 and 4 were 90-100% and 95-100%, respectively, thereby indicating that polymer layers had been formed substantially on their entire pore walls. The number of bending strokes until rupture were about 45,000 strokes and 48,000 strokes, respectively. Compared with 50,000 strokes of an untreated porous polyethylene hollow fiber, these values are not significantly different. It was hence confirmed that the strength of the hydrophilized porous hollow fibers was not changed substantially. Similar to Example 1, the water-washing and drying operation was also performed 5 times to evaluate their durability. Both hollow fibers gave good results.

EXAMPLES 7 & 8

Porous polyethylene hollow fibers of the same type as that employed in Example 2 were separately immersed for 5 seconds in their corresponding solutions of the compositions shown in Table 1. They were then taken out of their corresponding solutions and put in a nitrogen gas atmosphere, in which extra solutions were removed. After being dried for 16 hours in air, each of the porous hollow fibers were exposed at a distance of 20 cm for 3 seconds to a high-pressure mercury vapor lamp (rated power input: 80 W/cm) in a nitrogen gas atmosphere so that the surface-active monomers were polymerized. The resulting porous hollow fibers were then thoroughly washed with acetone to obtain hydrophilized porous membranes of this invention.

The amounts of the polymer held on their corresponding porous membranes and the water penetration pressures of the porous membranes were measured. Their durability was also evaluated in the same manner as in Example 2. Good results were obtained.

The results are also shown in Table 1.

However, the number of bending strokes until rupture in their flex fatigue tests were about 500 times and about 300 times, respectively. Compared with the porous membrane produced by the heat polymerization technique in Example 2, the strength of the matrix of each of the porous membranes was reduced significantly.

EXAMPLE 9

A hydrophilized porous membrane was obtained in the same manner as in Example 2 except that, instead of heat polymerization, polymerization was conducted by using an electron irradiation apparatus and by irradiating electron beams to the porous membrane at 20 Mrad at an acceleration voltage of 200 KV, an electron stream of 8.1 mA and a temperature of 80° C. or lower. The amount of the resultant polymer held on the porous membrane and the water penetration pressure were measured. As shown in Table 1, relatively good results were obtained. On the other hand, the number of bending strokes required until rupture in a flex fatigue test was about 100 strokes. The strength of the matrix of the porous membrane was also significantly reduced in this Example.

EXAMPLE 10

A planar porous polyethylene membrane, which had slit-like pores having an average width of 0.8 μm and an average length of 3 μm, a porosity of 70%, a membrane thickness of 42 μm, and a water permeability of 3.5 l/m$^2$.hr.mmHg as measured by the alcohol-dependent hydrophilizing method, was immersed for 3 seconds in a solution of the composition given in Table 1. The membrane was thereafter taken out of the solution and put in a nitrogen gas atmosphere, where extra solution was removed. It was thereafter dried for 16 hours in air. The porous membrane was thereafter heat-treated at 70° C. for 20 minutes in a nitrogen gas atmosphere, followed by thorough washing with acetone to obtain a hydrophilized porous membrane of this invention. The amount of the polymer held on the membrane and the water penetration pressure were measured.

The results are shown in Table 1.

EXAMPLE 11

Porous polypropylene hollow fibers, which had slit-like pores having an average width of 0.2 μm and an average length of 0.8 μm, a porosity of 45%, a membrane thickness of 22 μm, an inner diameter of 200 μm and a water permeability of 0.8 μ/m$^2$.hr.mmHg as measured by the alcohol-dependent hydrophilizing method, was immersed for 5 seconds in a solution of the composition given in Table 1. The hollow fibers were thereafter taken out of the solution and put in a nitrogen gas atmosphere, where extra solution was removed. They were thereafter dried for 16 hours in air. The hollow fibers were then subjected to a heat treatment at 80° C. for 20 minutes in a nitrogen gas atmosphere, followed by thorough washing with acetone to obtain a hydrophilized porous membrane of this invention.

Thereafter, it was evaluated in the same manner as in Example 2.

The results are shown in Table 1.

COMPARATIVE EXAMPLES 1 & 2

Polymer-holding porous membranes were obtained in exactly the same manner as in Example 2 except for the use of a solution of the composition given in Table 1. Their performance was evaluated and the results are shown in Table 1. The water penetration pressures were 8.3 kg/cm$^2$ and 10.7 kg/cm$^2$, respectively, considerably higher than 0.2 kg/cm in Example 2. It is hence clear that these porous membranes did not have adequate hydrophilicity. In addition, the surface coverages (%) of the porous membranes of Comparative Examples 1 and 2 were 4–8% and 0–2%, respectively.

COMPARATIVE EXAMPLES 3

A porous membrane with a polymer held thereon was obtained in exactly the same manner as in Example 11 except that a solution of the composition given in Table 1 was used. Its performance was evaluated and the results are shown in Table 1. Its water penetration pressure was 11.3 kg/cm$^2$, which is a significantly high value compared with 0.5 kg/cm$^2$ in Example 11. It is hence understood that the porous membrane did not have adequate hydrophilicity.

COMPARATIVE EXAMPLE 4

Porous polyethylene hollow fibers of the same type as that used in Example 2 was immersed for 1 minute in a solution of the composition given in Table 1. The hollow fibers were then taken out of the solution and was dried at room temperature for 16 hours. The hollow fibers were then fabricated into a membrane module. The water penetration pressure of the membrane module was measured. It was found to be 0.2 kg/cm$^2$, which indicated that hydrophilicity had been imparted by the adhesion of the surface-active monomer. When a water-washing and drying test was effected once in the same manner as in Example 2, the water penetration pressure increased to 8.0 kg/cm$^2$. It is hence clear that the adhesion method could impart hydrophilicity only temporarily.

TABLE 1

| Ex. No. | Type of porous polyolefin membrane | Surface-active monomer Kind | HLB value | wt. parts | Solvent Kind | wt. parts | Polymerization catalyst Kind | wt. parts | Water penetration pressure (kg/cm$^2$) Before impartation of hydrophilicity | After impartation of hydrophilicity | After water-washing and drying | Amount of polymer held (wt. %) |
|---|---|---|---|---|---|---|---|---|---|---|---|---|
| Ex. 1 | Polyethylene hollow fiber | Compound of formula (1) | 9.2 | 100 | Water | 1000 | Benzoyl peroxide | 5 | 11.0 | 0.15 | 0.15 | 7.2 |
| Ex. 2 | Polyethylene hollow fiber | Compound of formula (1) | 9.2 | 100 | Acetone | 1000 | Benzoyl peroxide | 10 | 11.0 | 0.2 | 0.2 | 8.1 |
| Ex. 3 | Polyethylene hollow fiber | Compound of formula (2) | 17.2 | 100 | Acetone | 1000 | Benzoyl peroxide | 10 | 11.0 | 5.0 | — | 2.8 |
| Ex. 4 | Polyethylene hollow fiber | Compound of formula (3) | 6.5 | 100 | Acetone | 1000 | Benzoyl peroxide | 10 | 11.0 | 0.7 | 0.7 | 14.9 |
| Ex. 5 | Polyethylene hollow fiber | Compound of formula (4) | 5.8 | 100 | Acetone | 1000 | Benzoyl peroxide | 5 | 11.0 | 0.7 | — | 12.1 |
| Ex. 6 | Polyethylene hollow fiber | Compound of formula (5) | 3.1 | 100 | Acetone | 1000 | Benzoyl peroxide | 10 | 11.0 | 3.9 | — | 13.0 |
| Ex. 7 | Polyethylene | Compound | 9.2 | 100 | Acetone | 1000 | Chlorobenzo- | 3 | 11.0 | 0.6 | 0.7 | 4.1 |

TABLE 1-continued

| Ex. No. | Type of porous polyolefin membrane | Surface-active monomer Kind | HLB value | wt. parts | Solvent Kind | wt. parts | Polymerization catalyst Kind | wt. parts | Water penetration pressure (kg/cm²) Before impartation of hydrophilicity | After impartation of hydrophilicity | After water-washing and drying | Amount of polymer held (wt. %) |
|---|---|---|---|---|---|---|---|---|---|---|---|---|
| | hollow fiber | of formula (1) | | | tone | | phenone | | | | | |
| Ex. 8 | Polyethylene hollow fiber | Compound of formula (3) | 6.5 | 100 | Acetone | 1000 | Chlorobenzophenone | 3 | 11.0 | 1.3 | 1.4 | 6.5 |
| Ex. 9 | Polyethylene hollow fiber | Compound of formula (1) | 9.2 | 100 | Acetone | 1000 | Chlorobenzophenone | 3 | 11.0 | 0.4 | — | 4.7 |
| Ex. 10 | Planar polyethylene membrane | Compound of formula (6) | 10.3 | 100 | Acetone | 2000 | Chlorobenzophenone | 5 | 4.5 | 0.2 | — | 7.7 |
| Ex. 11 | Polypropylene hollow fiber | Compound of formula (7) | 12.6 | 100 | Methyl ethyl ketone | 1500 | Azobisisobutyronitrile | 3 | 15.0 | 0.5 | 0.5 | 11.8 |
| Comp. Ex. 1 | Polyethylene hollow fiber | Acrylic acid | 37 | 100 | Acetone | 1000 | Benzoyl peroxide | 10 | 11.0 | 8.3 | — | — |
| Comp. Ex. 2 | Polyethylene hollow fiber | Compound of formula (8) | 0.5 | 100 | Acetone | 1000 | Benzoyl peroxide | 10 | 11.0 | 10.7 | — | — |
| Comp. Ex. 3 | Polypropylene hollow fiber | 4-Vinylpyridine | 28 | 100 | Methyl ethyl ketone | 1500 | Azobisisobutyronitrile | 3 | 15.0 | 11.3 | — | — |
| Comp. Ex. 4 | Polyethylene hollow fiber | Compound of formula (1) | 9.2 | 100 | Acetone | 1000 | — | — | 11.0 | 0.2 | 8.0 | — |

Note:
(1) $H_2C=CHCOO(EO)_{12}(PO)_{20}(EO)_{12}CH_3$
(2) $H_2C=CHCOO(EO)_{14}COCH=CH_2$
(3) $H_2C=CHCOO((CH_2)_4O)_6COCH=CH_2$
(4) $H_2C=CHCOO(PO)_{50}(EO)_{13}COCH=CH_2$
(5) $H_2C=CHCOO(PO)_{50}(EO)_5COCH=CH_2$
(6) $H_2C=CHCOO(EO)_{12}(PO)_{20}(EO)_{12}COCH=CH_2$ (7) 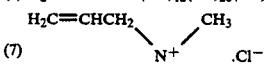

(8) $H_2C=CHCOO(PO)_{55}COCH=CH_2$ (9) 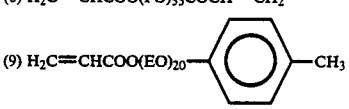

In the above formulae, EO means $-CH_2CH_2O-$ and PO denotes $-CH_2CHO-$ with $CH_3$ substituent.

EXAMPLE 12

A planar poly-4-methyl-1-pentene porous membrane which had slit-like pores having an average width of 0.2 μm and an average length of 0.5 μm, a porosity of 43%, a membrane thickness of 35 μm, and a water permeability of 0.2 l/m².hr.mmHg as measured by the alcohol-dependent hydrophilizing method, was immersed for 3 seconds in a solution of the composition given in Table 2. The membrane was thereafter taken out of the solution and put in a nitrogen gas atmosphere. It was thereafter dried for 10 minutes to remove extra solution. The membrane was then heated and polymerized at 75° C. for 25 minutes in a nitrogen gas atmosphere, followed by its thorough washing with acetone to obtain a hydrophilized porous membrane of this invention.

Thereafter, its performance was evaluated in the same manner as in Example 2. The results are shown in Table 2.

EXAMPLE 13

A polymer-holding porous membrane was obtained in exactly the same manner as in Example 2 except for the use of a solution of the surface-active monomer given in Table 2. Its performance was evaluated and the results are shown in Table 2.

EXAMPLE 14

A porous polyethylene hollow fiber of the same type as that employed in Example 1 was fed continuously at a speed of 2 m/min into a solution bath of 10 cm long, whereby the hollow fiber was subjected to a dipping treatment. In a first pipe 2 cm in diameter and 4 m long, the accompanying extra solution was removed and the hollow fiber was dried. Heat polymerization was then effected in a second pipe 2 cm in diameter and 3 m long.

The solution shown in Table 2 was filled in the solution bath. Nitrogen gas of room temperature and hot nitrogen gas of 80° C. were caused to flow at 20 l/min through the first and second pipes respectively Thereafter, the hollow fiber was thoroughly washed in an aqueous solution which contained 50 vol.% of ethanol and was then washed in water of 60° C. to obtain a hydrophilized porous membrane of this invention.

The surface coverage (%) of the porous membrane was 95-100%. It was observed that the resultant polymer had been formed substantially over the entire pore walls. Further, the number of bending strokes until rupture was about 4,900 times. This number did not change substantially compared with that before the treatment. In the same manner as in Example 1, 5 cycles of water-washing and drying treatments were effected to evaluate the durability. Good results were obtained.

These results are shown in Table 2.

EXAMPLE 15

A hydrophilized porous membrane according to this invention was obtained in exactly the same manner as in Example 14 except that the composition of the solution was changed to that shown in Table 2.

The surface coverage (%) of the porous membrane was 95-100%. It was observed that the resultant polymer had been formed substantially over the entire pore walls. Further, the number of bending strokes until rupture was about 5,000 strokes. This number did not change substantially compared with that before the treatment. In the same manner as in Example 1, 5 cycles of water-washing and drying treatments were effected to evaluate the durability. Good results were obtained.

The results are shown in Table 2.

EXAMPLE 16

A hydrophilized porous membrane according to this invention was obtained by using a porous polypropylene hollow fibers of the same type as that employed in Example 11 and the solution given in Table 2 in the same manner as in Example 14 except that the temperature of the hot nitrogen gas was maintained at 85° C. and the flow rate was set at 10 l/min.

EXAMPLE 17

A hydrophilized porous membrane according to this invention was obtained by using porous poly-4-methyl-1-pentene hollow fibers, which had slit-like pores having an average width of 0.2 μm and an average length of 0.5 μm, a porosity of 40%, a membrane thickness of 35 μm, an internal diameter of 200 μm, and a water permeability of 0.2 μ/m².hr.mmHg as measured by the alcohol-dependent hydrophilizing method, and the solution given in Table 2 in the same manner as in Example 14 except that the temperature of the hot nitrogen gas was maintained at 90° C., the flow rate of the hot nitrogen was set at 30 l/min and the feeding speed of the hollow fiber was controlled at 3 m/min. The performance of the membrane was evaluated. The results are shown in Table 2.

As apparent from the above Examples, it is clear that the porous membranes according to this invention had extremely low water penetration pressures and superior hydrophilicity compared with the untreated porous polyolefin membranes. In the evaluation of their durability by the repetition of the water-washing and drying treatments, their water penetration pressures did not change substantially. It is hence clear that the porous membranes of this invention had hydrophilicity having excellent durability.

TABLE 2

| Ex. No. | Type of porous polyolefin membrane | Surface-active monomer Kind | HLB value | wt. parts | Solvent Kind | wt. parts | Polymerization catalyst Kind | wt. parts | Water penetration pressure (kg/cm²) Before impartation of hydrophilicity | After impartation of hydrophilicity | After water-washing and drying | Amount of polymer held (wt. %) |
|---|---|---|---|---|---|---|---|---|---|---|---|---|
| Ex. 12 | Poly-4-methyl-1-pentene planar membrane | Compound of formula (6) | 9.2 | 100 | Acetone | 1000 | Benzoyl peroxide | 10 | 12.8 | 0.5 | — | 4.7 |
| Ex. 13 | Polyethylene hollow fiber | Compound of formula (9) | 5.2 | 100 | Acetone | 1000 | " | 10 | 11.0 | 0.4 | — | 7.5 |
| Ex. 14 | Polyethylene hollow fiber | Compound of formula (1) | 9.2 | 100 | Acetone | 1000 | Bis(4-t-butyl-cyclohexyl) peroxy dicarbonate | 10 | 11.0 | 0.3 | 0.3 | 7.0 |
| Ex. 15 | Polyethylene hollow fiber | Compound of formula (5) | 5.8 | 100 | Acetone | 1000 | Bis(4-t-butyl-cyclohexyl) peroxy dicarbonate | 10 | 11.0 | 0.6 | 0.7 | 13.3 |
| Ex. 16 | Polypropylene hollow fiber | Compound of formula (1) | 9.2 | 100 | Acetone | 1000 | Bis(4-t-butyl-cyclohexyl) peroxy dicarbonate | 10 | 15.0 | 0.4 | 0.4 | 12.0 |
| Ex. 17 | Poly-4-methyl-1-pentene hollow fiber | Compound of formula (1) | 9.2 | 100 | Acetone | 1000 | Benzoyl peroxide | 10 | 12.8 | 0.5 | 0.5 | 4.8 |

What is claimed is:

1. A hydrophilized porous polyolefin membrane, wherein a polymer of a monomer containing at least one unsaturated polymerizable bond and having an HLB value of 2-20 is held on at least a part of the pore walls of a starting porous polyolefin membrane.

2. The hydrophilized porous polyolefin membrane as claimed in claim 1, wherein the HLB value of the monomer is 5-15.

3. The hydrophilized porous polyolefin membrane as claimed in claim 1, wherein the starting porous membrane is in the form of hollow fibers.

4. The hydrophilized porous polyolefin membrane as claimed in claim 1, wherein the polyolefin is a polymer composed principally of at least one monomer selected from the group consisting of ethylene, propylene, 4-methyl-1-pentene and 3-methyl-1-butene.

* * * * *

UNITED STATES PATENT AND TRADEMARK OFFICE
CERTIFICATE OF CORRECTION

PATENT NO. : 4,717,479

DATED : January 5, 1988

INVENTOR(S) : HAJIME ITOH ET AL

It is certified that error appears in the above-identified patent and that said Letters Patent is hereby corrected as shown below:

| Col. | Line | |
|---|---|---|
| 1 | 22, | delete "have" and insert --has--, |
| 1 | 43, | insert --,-- after "Accordingly", |
| 2 | 18, | delete "polyolefine" and insert --polyolefin--, |
| 2 | 30, | insert --.-- after "monomer", |
| 2 | 44, | delete "pend" and insert --pending--, |
| 4 | 49, | delete "is" and insert --are--, |
| 5 | 16, | delete "cause" and insert --caused--, |
| 6 | 62, | after "high" insert --of a--, |
| 8 | 23, | delete "ples" and insert --ple--, |
| 9 | 51, | delete "operation" and insert --operations--, |
| 10 | 21, | delete "were" and insert --was--, |
| 10 | 40, | delete "were" and insert --was--, |
| 10 | 54, | delete "were" and insert --was--, |
| 11 | 34, | delete "$\mu$" and insert --$\ell$--, |
| 12 | 12, | delete "cm" and insert --$cm^2$--, |
| 12 | 31, | delete "was" and insert --were--, |
| 12 | 34, | delete "was" and insert --were--, |
| 14 | 63, | insert --.-- after "respectively--, |
| 16 | 4, | delete "$\mu$" and insert --$\ell$--, |

UNITED STATES PATENT AND TRADEMARK OFFICE
CERTIFICATE OF CORRECTION

PATENT NO.  : 4,717,479
DATED       : January 5, 1988
INVENTOR(S) : HAJIME ITOH ET AL It is certified that error appears in the above-identified patent and that said Letters Patent is hereby corrected as shown below:

Table 2, under Polymerization Catalyst delete "ditto" and insert --Benzoyl Peroxide--, Signed and Sealed this First Day of November, 1988

Attest:

DONALD J. QUIGG

Attesting Officer

Commissioner of Patents and Trademarks